United States Patent [19]

Sommer

[11] Patent Number: 5,360,091

[45] Date of Patent: Nov. 1, 1994

[54] ELECTRICALLY ACTUATED CLUTCH BRAKE APPARATUS

[75] Inventor: Gordon M. Sommer, Grosse Pointe Farms, Mich.

[73] Assignee: Midwest Brake Bond Co., Warren, Mich.

[21] Appl. No.: 158,916

[22] Filed: Nov. 29, 1993

Related U.S. Application Data

[63] Continuation of Ser. No. 920,261, Jul. 27, 1992, Pat. No. 5,291,977.

[51] Int. Cl.5 ...................... F16D 67/06; B60K 41/24
[52] U.S. Cl. .............................. 192/18 B; 192/103 R; 192/113.23; 192/147
[58] Field of Search .............. 192/0.094, 12 D, 18 B, 192/113 AD, 144, 147, 90, 103 R, 113.23

[56] References Cited

U.S. PATENT DOCUMENTS

| | | |
|---|---|---|
| 1,623,349 | 4/1927 | Knutsen . |
| 2,659,830 | 11/1953 | Mason . |
| 3,089,574 | 5/1963 | Howard . |
| 3,258,092 | 6/1966 | Schiebeler .................... 192/18 B |
| 3,268,047 | 8/1966 | Grygera et al. . |
| 3,319,748 | 5/1967 | Joyce, Jr. . |
| 3,379,292 | 4/1968 | Grygera . |
| 3,487,438 | 12/1969 | Becker et al. . |
| 3,494,450 | 2/1970 | Mankowsky et al. . |
| 3,587,798 | 6/1971 | Schuman ...................... 192/12 D |
| 3,599,764 | 8/1971 | Daab et al. ................... 192/12 D |
| 3,614,999 | 10/1971 | Sommer . |
| 3,687,250 | 8/1972 | James et al. . |
| 3,696,898 | 10/1972 | Sommer ................. 192/113 AD X |
| 3,713,517 | 1/1973 | Sommer . |
| 3,750,786 | 8/1973 | Toyohama et al. . |
| 3,921,770 | 11/1975 | Daab et al. ................... 192/12 D |
| 4,067,427 | 1/1978 | Cackley . |
| 4,096,931 | 6/1978 | Whitehurst . |
| 4,135,611 | 1/1979 | Spanke . |
| 4,183,425 | 1/1980 | Sommer . |
| 4,300,082 | 11/1981 | Angersbach et al. ........ 192/12 D X |
| 4,346,796 | 8/1982 | Ueno . |
| 4,432,443 | 2/1984 | Sommer . |
| 4,538,717 | 9/1985 | Blohm et al. .................... 192/0.094 |
| 4,552,255 | 11/1985 | Sommer . |
| 4,577,738 | 3/1986 | Yater . |
| 4,580,674 | 4/1986 | Weber . |
| 4,607,736 | 8/1986 | Kelley . |
| 4,643,282 | 2/1987 | Edl . |
| 4,693,350 | 9/1987 | Sommer . |
| 4,982,825 | 1/1991 | Sekella . |
| 5,172,798 | 12/1992 | Mabee ............................. 192/18 B |
| 5,195,623 | 3/1993 | Sommer ........................... 192/18 B |

FOREIGN PATENT DOCUMENTS

5786643 11/1980 Japan .
1437609 9/1973 United Kingdom .

*Primary Examiner*—Rodney H. Bonck
*Attorney, Agent, or Firm*—Harness, Dickey & Pierce

[57] ABSTRACT

There is provided a clutch/brake unit having aligned input and output shafts, clutch disks partially immersed in oil carried by the input shaft, brake disks partially immersed in oil fixed to the housing, and two series of friction disks also partially immersed in oil each series of friction discs secured to the output shaft and each series engagable by separate DC voltage coils. A fan is provided which is rotatable with the input shaft to provide cooling air to the clutch/brake unit. The operation of the clutch/brake unit is controlled by a computer which controls the relationship of the output shafts speed in relation to time.

9 Claims, 4 Drawing Sheets

ELECTRICALLY ACTUATED CLUTCH BRAKE APPARATUS

This is a continuation of U.S. patent application Ser. No. 07/920,261, filed Jul. 27, 1992 and now U.S. Pat. No. 5,291,977.

BACKGROUND OF THE INVENTION

The present invention relates generally to a combination clutch/brake unit. More particularly, the present invention relates to a new and improved oil shear clutch/brake unit having frictionally engagable clutch and brake plates and disks which are at least partially immersed in a bath of oil so that the kinetic energy produced in starting and stopping heavy loads is transmitted by "shearing" the oil between the various plates and disks. It has been found that this type of immersion increases the life of the friction elements over those in clutch and brake units which operate dry. The oil immersion type of clutch and brake unit also increases the maximum operating speeds.

Clutch/brake units of various types have long been employed to transmit rotational energy between a power source and equipment to be driven thereby. Such units are generally employed so as to provide means for alternately starting and stopping such driven equipment. The inclusion of the braking feature enables more rapid deceleration of the output shaft than that provided by friction alone. When it becomes necessary to accurately position a machine, machine tool or work piece, a servo has been employed. Along with the servo comes the problems associated with servos including the servo's complexity and specialized maintenance.

It is accordingly a general object of the present invention to provide a new and improved clutch/brake unit.

It is another object of the present invention to provide a new and improved clutch/brake unit that utilizes a plurality of oil submerged friction disk torque transmitting elements which will exhibit a minimal mount of wear by virtue of the fact that the torque transmitting function is achieved by the shearing of oil interjacent the disks.

It is still another object of the present invention to provide a new and improved clutch/brake unit of the above character that can be operated at high speeds and at high cycle rates as a result of a low drive inertia and an effective oil cooling medium.

It is a further object of the present invention to provide a clutch/brake unit wherein the clutch and brake functions are electronically controlled and able to emulate a servo without the servo's complexity and specialized maintenance.

It is another object of the present invention to provide a new and improved clutch/brake unit that will find universality of application.

Further important objects of the present invention are to provide a new and improved clutch/brake unit which is simple in design, economical to produce and operate, extremely rugged and maintenance-free during operation, and wherein the input and output shafts thereof are readily adapted for mounting to any associated machine, gears, sheaves, couplings, etc.

Other objects and advantages of the present invention will become apparent from the following detailed description taken in conjunction with the accompanying drawings.

DESCRIPTION OF THE PREFERRED EMBODIMENT

FIGS. 1 through 4 show a clutch/brake unit in accordance with the present invention and is designated by the reference numeral 10. The clutch/brake unit 10 comprises input shaft 12, homing assembly 14, clutch 16, drive brake 18, output shaft 20 and a controlling computer (not shown) which is in communication with an encoder 22 for determining the position of the driven equipment.

Input shaft 12 is driven at one end 30 at a specified speed by a two speed drive motor (not shown). A high-speed potentiometer and a low-speed potentiometer adjust the high and low operating speeds of the motor through a simple digital frequency converter. The two speed drive motor can be connected to the input shaft 12 by a flexible coupling, drive belts or any other connection means known in the art. In the embodiment shown in FIGS. 1–3, end 30 of the input shaft 12 is provided with a female spline 32 to facilitate connection to the two speed drive motor. Input shaft 12 is rotatably disposed within housing assembly 14 by a roller bearing 34. The end of the input shaft opposite the drive end 30 defines a first cylindrical shaped chamber 38 and a second cylindrical shaped chamber 40. Disposed within first cylindrical shaped chamber 38 is a seal 42 for isolating female spline 32 and a roller beating 44 for supporting the output shaft 20 as will be explained later herein. Second cylindrical shaped chamber 38 has an internal surface 46 which is adapted with a plurality of axially extending splines 48 to support a plurality of driving clutch plates 168 of the clutch 16 as will be described later herein.

Figure 1:
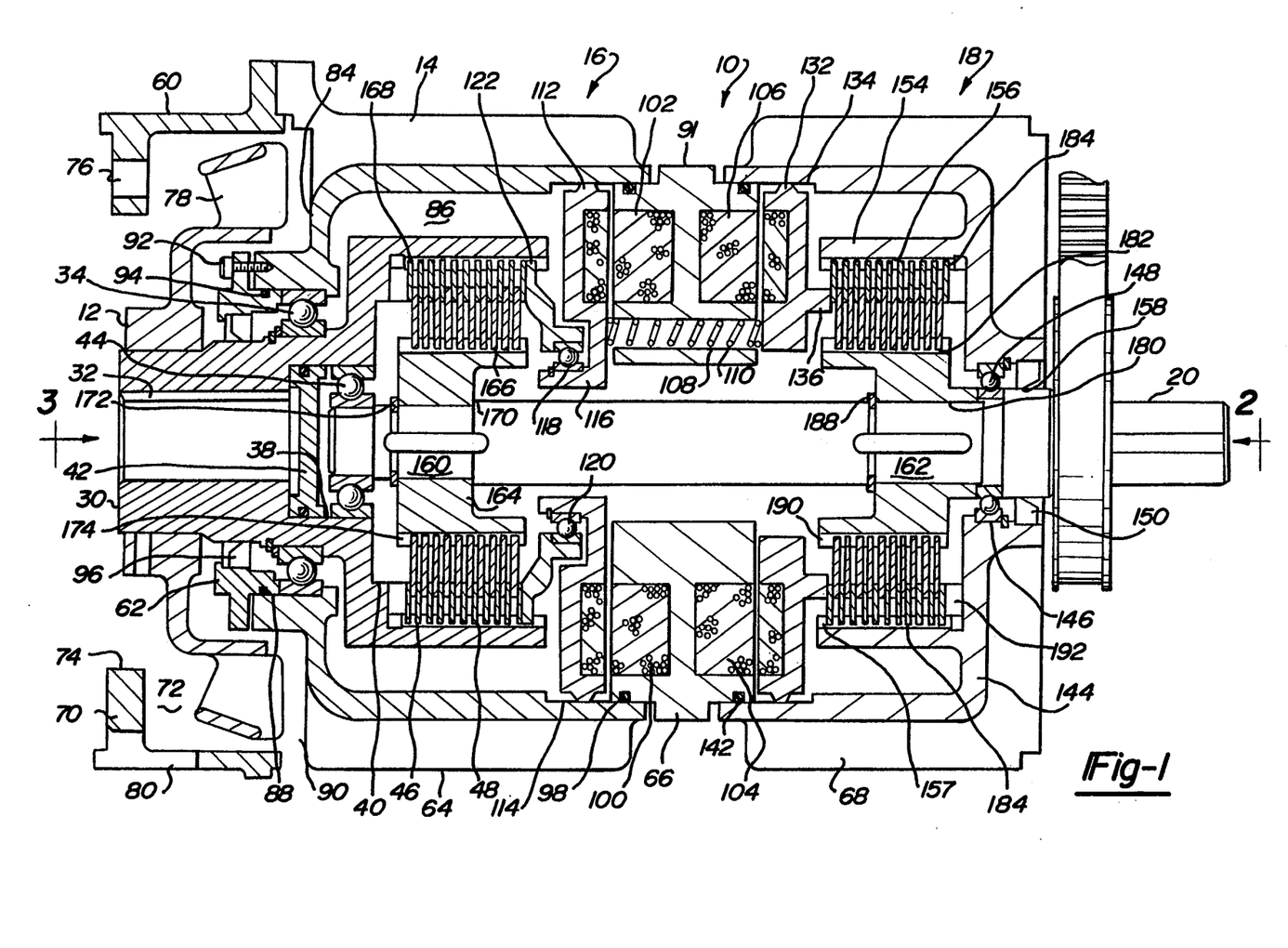
FIG. 1 is a longitudinal side elevation view, partially in cross section, of a clutch brake unit of the present invention.
Figure 2:
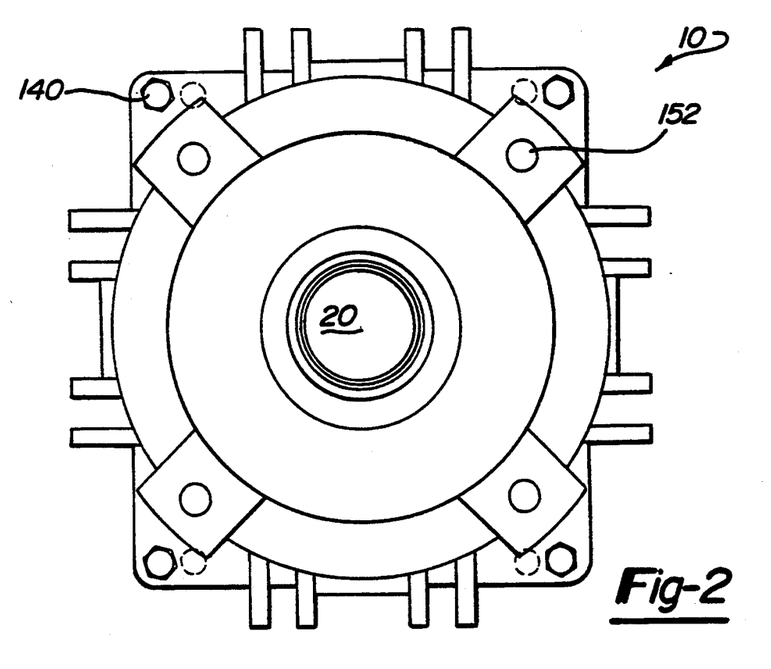
FIG. 2 is an end view of the clutch/brake unit of FIG. 1 taken in the direction of arrow 2.
Figure 3:
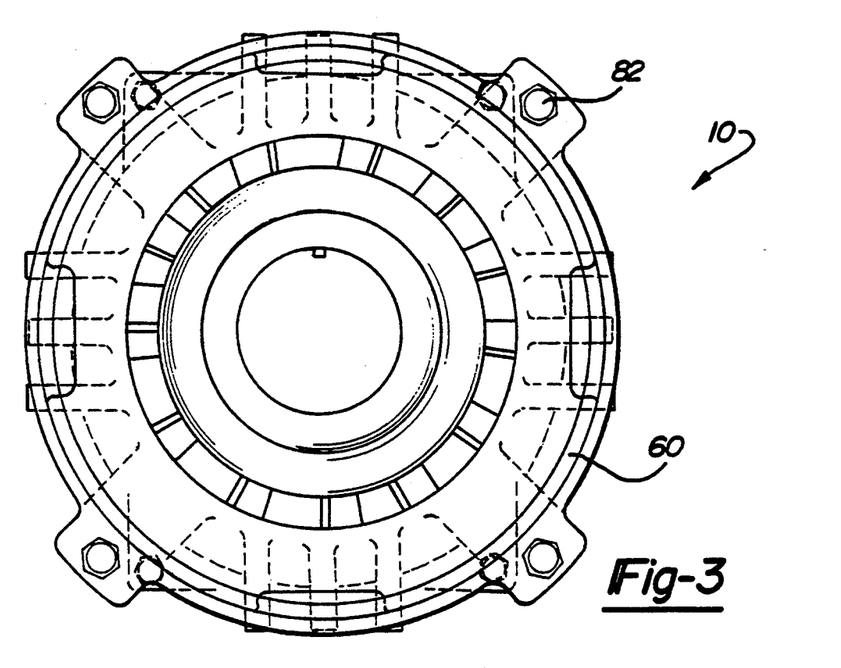
FIG. 3 is an end view of the clutch/brake unit of FIG. 1 taken in direction of arrow 3.
Figure 4:
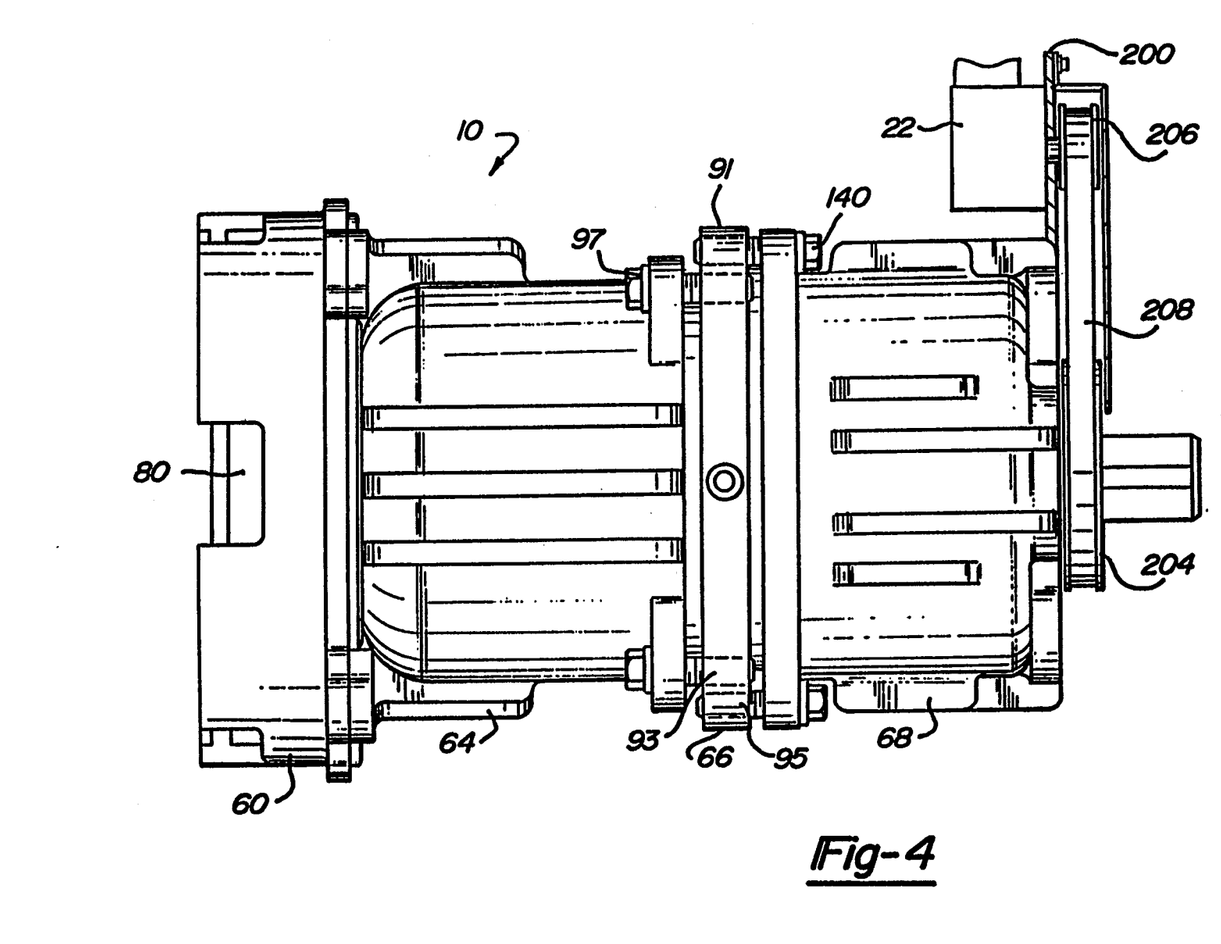
FIG. 4 is a plan view of the clutch/brake unit of FIG. 1.

Housing assembly 14 comprises a fan housing 60, a bearing seal ,housing 62, a clutch housing 64, a clutch/-brake control housing 66 and a brake housing 68.

Fan housing 60 is generally cylindrical in shape and has a single end wall 70 which partially defines an interior cavity 72. End wall 70 has a circular opening 74 provided therein to allow access to the input shaft 12 by the two speed drive motor. Disposed radially outward from the large opening 74 are a plurality of circumferentially spaced mounting holes 76 for securing the fan housing 60 to the two speed drive motor. The end of the fan housing 60 opposite to the end wall 70 is adapted to be fixedly secured to the clutch housing 64. Disposed within interior cavity 72 is fan 78 which is fixedly mounted to input shaft 12 for rotation therewith. Fan housing 60 has a plurality of air inlet apertures 80 which allow for passage of cooling air being pumped by fan 78.

Clutch housing 64 is adapted at one end to be fixedly secured to fan housing 60 by a plurality of circumferentially spaced mounting bolts 82. The opposite end of the clutch housing 64 is adapted to be fixedly and sealably attached to clutch/brake control housing 66. Clutch housing 64 is generally cylindrical in shape and has a single end wall 84 adjacent the end of the control housing 64 adapted to mate with fan housing 60. End wall 84 completes the formation of interior cavity 72 and partially forms a second interior cavity 86. Disposed within second interior cavity 86 is the first and second cylindrical shaped chambers 38 and 40 of the input shaft 12. End wall 84 further defines inner cylindrical surface 88 which supports miter bearing 34 and forms a locating surface for bearing seal housing 62. The interface between the fan housing 70 and the beating seal housing 62 defines a plurality of air outlet apertures 90 which allow for passage of cooling air being pumped by fan 78. The air outlet apertures 90 cooperate with the air inlet apertures 80 to create a path for air pumped by fan 78 to flow across clutch housing 64 and aid in the cooling of oil disposed within second interior cavity 86. The bearing seal housing 62 is adapted to be fixedly and sealably attached to clutch housing 64 by a plurality of circumferentially spaced bolts 92 and seal 94. Bearing seal housing 62 is located by inner cylindrical surface 88 and locates an additional seal 96 relative to input shaft 12. Seal 96 rides against input shaft 12 and seals the oil disposed within second interior cavity 86.

Clutch/brake control housing 66 is an annular shaped housing having a flange 91 disposed on its exterior surface, midway between each end. Flange 91 has a first plurality of mounting holes 93 for securing clutch/brake control housing 66 to clutch housing 64 using a plurality of bolts 97 and is sealed by seal 98. Flange 90 further has a second plurality of mounting holes 95 for securing clutch/brake control homing 66 to brake homing 68. The interior portion of clutch/brake control homing 66 defines a continuation of second interior Disposed within the annular portion of clutch/brake control housing 66 is a clutch coil cavity 100 which is located in the end of the clutch/brake control housing 66 adjacent to the clutch housing 64 and a brake coil cavity 104 which is located in the end of the clutch/brake control housing 66 adjacent to the brake housing 68. Disposed within clutch coil cavity 100 is a DC voltage clutch coil 102 and disposed within brake coil cavity 104 is a DC voltage brake coil 106. A plurality of circumferentially spaced spring bores 108 are also located in the annular portion of clutch/brake control housing 66 radially inward from clutch and brake coil cavities 100 and 104 and extend completely through clutch]brake control homing 66. Disposed within the plurality of circumferentially spaced spring bores 108 are a plurality of coil springs 110.

An annular clutch pressure plate 112, located between input shaft 12 and clutch/brake control housing 16, is axially aligned with the annular clutch/brake control housing 16 and is in contact with one end of the plurality of coil springs 110. Clutch pressure plate 112 is located in an annular recess 114 of clutch homing 64 such that it is capable of moving axially. Clutch pressure plate 112 has an axially extending cylindrical portion 116 which has an exterior surface 118 for locating a roller bearing 120 which rotatably mounts a clutch activation member 122 which provides the means for engaging and disengaging clutch 16. The plurality of coil springs 110 urge clutch pressure plate 112 and clutch activation member 122 axially to the left as shown in FIG. 1. In this position, clutch 16 is in the engaged position. Upon activation of DC voltage clutch coil 102, clutch pressure plate 112 and clutch activation member 122 are magnetically attracted to clutch/brake control housing 66 and move axially to the right as shown in FIG. 1. The magnetic attraction of DC voltage clutch coil 102 overcomes the spring force of the plurality of coil springs 110 and clutch 16 is disengaged. When the power to DC voltage clutch coil 102 is terminated, the plurality), of coil springs 110 urge clutch pressure plate 112 to the left as shown in FIG. 1, again engaging clutch 16.

An annular drive brake pressure plate 132, located on the side of clutch/brake control housing 66 adjacent brake homing 68 is axially aligned with annular clutch/brake control housing 16 and is in contact with the second end of the plurality of coil springs 110. Drive brake pressure plate 132 is located in an annular recess 134 of brake housing 68 such that it is capable of moving axially. Drive brake pressure plate 132 has an axially extending cylindrical ring 136 which provides the means for applying and releasing drive brake 18. The plurality of coil springs 110 urge the brake pressure plate 132 axially to the right as shown in FIG. 1. In this position, drive brake 18 is in the applied condition. Upon activation of DC voltage brake coil 106, drive brake pressure plate 132 is magnetically attracted to clutch/brake control homing 66 and moves axially to the left as shown in FIG. 1. The magnetic attraction of DC voltage brake coil 106 overcomes the spring forces of the plurality of coil springs 110 and brake 18 is released. When the power to DC voltage brake coil 106 is terminated, the plurality of coil springs 110 urge drive brake pressure plate 132 to the right as shown in FIG. 1, again applying brake 18.

Brake housing 68 is generally cylindrical in shape and is adapted at one end to be fixedly secured to clutch/brake housing 66 by a plurality of circumferentially spaced mounting bolts 140 and is sealed by seal 142. The opposite end of brake housing 64 has an end wall 144 which completes the formation of second interior cavity 86. End wall 144 further defines an inner cylindrical surface 146 which supports roller bearing 148 and forms a locating surface for seal 150. The outside of end wall 144 has a plurality of mounting holes 152 which facilitate the attachment of clutch/brake unit 10 to the driven apparatus (not shown). Brake housing 68 also has an axially extending cylindrical portion 154 extending towards input shaft 12. The extending cylindrical portion 154 has an internal surface 156 which is adapted with a plurality of splines 157 to support a plurality of reaction brake plates 184 of brake 18.

Output shaft 20 is rotatable mounted in roller bearings 44 and 148 and extends axially from roller bearing 44 located in first cylindrical chamber 38 of input shaft 12 through clutch housing 64, through clutch/brake control housing 66, through brake housing 68 and extends axially past brake housing 68. The end of output shaft 20 extending beyond brake housing 68 is adapted to be secured to the driven apparatus (not shown). Located axially along the output shaft 20 are a clutch mounting area 160 and a drive brake mounting area 162. Output shaft 20 has a seal surface 158 upon which seal 150, which is located in brake housing 68, rides against to seal second internal cavity 86. Second internal cavity 86 contains a quantity of lubricating oil which lubricates roller bearings 34, 44, 120 and 148 as well as providing the necessary oil for the oil shear action of clutch 16 and brake 18.

Clutch 16 is an oil shear clutch which comprises a clutch disk support member 164, a plurality of driven clutch plates 166 and the plurality of driving clutch plates 168. Clutch disk support member 164 is fixedly mounted to output shaft 16 in clutch mounting area 160 such that it rotates with output shaft 16. Clutch disk support member 164 is positioned against shoulder 170 on output shaft 20 and is held in position by snap ring 172. The outer surface of clutch disk support member 164 is provided with a plurality of axially extending splines 174 for connecting engagement with associated notches formed in the inner periphery of the plurality of driven clutch plates 166. The plurality of driven clutch plates 166 are free to move axially between an annular clutch friction plate 174 secured to input shaft 12 and clutch actuation member 122.

The plurality of driving clutch plates 168 are disposed interjacent or interleaved between the plurality of driven clutch plates 166 and are provided with notches on their outer periphery for connecting engagement with splines 48 of input shaft 12. The plurality of driving clutch plates 168 are also free to move axially between clutch friction plate 174 and clutch actuation member 122.

In operation, the plurality of coil springs 110 normally bias the clutch actuation member 122 to the left as shown in FIG. 1. This biasing of clutch actuation member 122 to the left, as shown in FIG. 1, causes the driving clutch plates 168 and driven clutch plates 166 to be clamped together between clutch friction plate 174 and clutch actuation member 122 thus locking the input shaft to the output shaft for rotation together. When DC voltage is applied to DC voltage clutch coil 102, driving clutch plates 168 and driven clutch plates 166 are free to rotate relative to each other whereby input shaft 12 is free to rotate relative to output shaft 20. When the DC voltage is removed from clutch coil 102, the plurality of coil springs 110 again clamp the driving and driven clutch plates 168 and 166 together locking input shaft 12 to output shaft 20.

Drive brake 20 is an oil shear brake which comprises a drive brake disk support member 180, a plurality of driving brake plates 182 and the plurality of reaction brake plates 184. Drive brake disk support member 180 is fixedly mounted to output shaft 20 in drive brake mounting area 162 such that it rotates with output shaft 16. Drive brake disk support member 180 is held in position by snap ring 188. The outer surface of brake disk support member 180 is provided with a plurality of axially extending splines 190 for connecting engagement with associated notches formed in the inner periphery of the plurality of driving brake plates 182. The plurality of driving brake plates 182 are free to move axially between an annular brake reaction plate 192 secured to brake housing 68 and brake actuation ring 136 extending from brake pressure plate 132.

The plurality of reaction brake plates 184 are disposed interjacent or interleaved between the plurality of driving brake plates 182 and are provided with notches on their outer periphery for connecting engagement with splines 157 of brake housing 68. The plurality of reaction brake plates 184 are also free to move axially between brake reaction plate 192 and brake reaction ring 136.

In operation, the plurality of coil springs 110 normally bias brake pressure plate 132 and brake reaction ring 136 to the right as shown in FIG. 1. This biasing of brake reaction ring 136 to the right as shown in FIG. 1, causes the driving brake plates 182 and reaction brake plates 184 to be clamped together between brake reaction plate 192 and brake reaction ring 136 thus locking output shaft 20 to brake housing 68 and prohibiting rotation thereof. When DC voltage is applied to DC voltage brake coil 106, driving brake plates 182 are free to rotate relative to the reaction brake plates 184 whereby output shaft 20 is free to rotate relative to brake housing 68. When DC voltage is removed from brake coil 106, the plurality of springs 110 again clamp driving and reaction brake plates 182 and 184 together locking output shaft 20 to brake housing 68.

Encoder 22 is secured to housing assembly 14 by using an adaptor 200 which is bolted to housing assembly 14 by a plurality of bolts (not shown). Encoder 22 receives its rotational information via a pulley 204 fixedly secured to output shaft 20, a pulley 206 fixedly secured to encoder 22 and a drive belt 208 connecting pulleys 204 and 206. Encoder 22 has an output of 2000 counts per revolution. A 4-times divider circuit increases the effective counts to 8000 counts per revolution. Thus the encoder is capable of accurately predicting the rotative position of the output shaft which in turn identifies the position of the driven apparatus.

Figure 5:
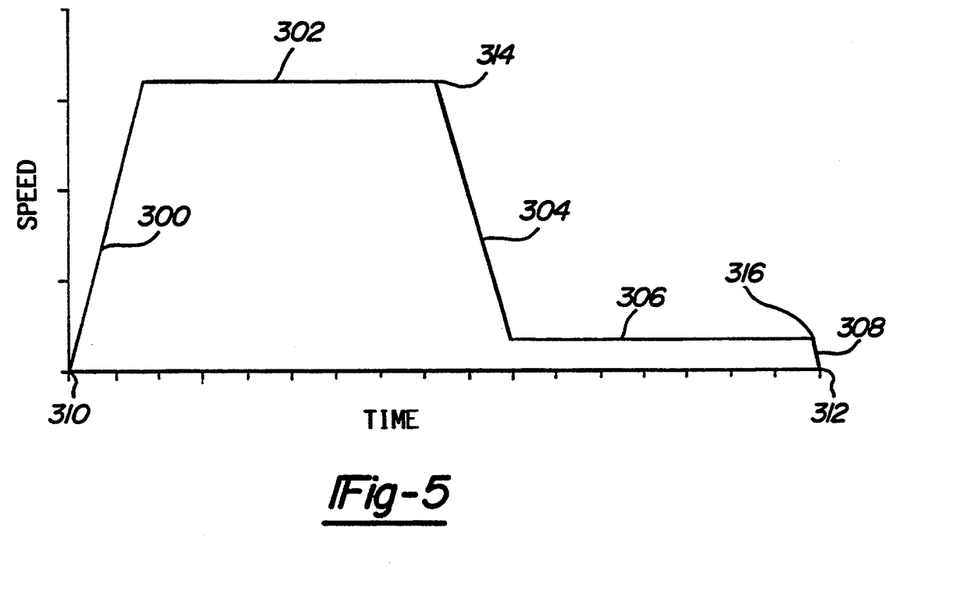
FIG. 5 is a motion diagram of a typical cycle which can be obtained utilizing the clutch/brake unit of the present invention.

The motion diagram in FIG. 5 represents a typical motion curve achievable with the clutch/brake unit of the present invention when driven by the two speed drive motor. The motion diagram in FIG. 5 comprises five stages of motion, an initial acceleration stage 300, a high speed stage 302, a high speed deceleration stage 304, a low speed stage 306 and a low speed deceleration stage 308. The start position 310 and the stop position 312 are fixed. The controlling computer must be "taught" where the high speed stage 302 ends, point 314 in FIG. 5, and where the low speed stage 306 ends, point 316 in FIG. 5. In addition, the controlling computer must be given both the acceleration and deceleration rates for stages 300 and 304.

The acceleration rate for stage 300 is controlled by clutch 16 by changing the DC voltage applied to clutch coil 102. The time (in seconds) desired to accelerate the machine to high speed is entered into the control computer while the control computer is in the LEARN mode. In a similar manner, the deceleration rate of stage 304 is controlled by drive brake 18 by changing the DC voltage applied to brake coil 106. The time (in seconds) desired to decelerate the machine from high speed to low speed is also entered into the control computer while the control computer is in the LEARN mode. The rate of deceleration does not have to be the same as the rate of acceleration.

The point 314 where high speed travel ends and point 316 where low speed travel ends can either be entered into the computer by jogging the drive to those respective positions and entering them into the control computer during the LEARN mode by pushing the appropriate button or they can entered in digital counts as would be with a servo. Multiple slow speed and stop positions can be entered.

Once the initial information has been "taught" to the control computer, the machine is cycled five times while in the LEARN mode. During the five LEARN mode cycles, the control computer determines the mount of DC voltage which is required to be supplied to the coils 102 and 106 in order to achieve the desired rates of acceleration and deceleration respectively. Thus, the control computer has the capability of self-adjusting the rate of applying the DC voltage to meet the both coils 102 and 106 specified speed/time relationship.

The operation of the cycle begins with power being supplied to the two speed drive motor through a high speed potentiometer thus operating the two speed drive motor at high speed driving input shaft 12. Clutch 16 is in the disengaged position and drive brake 18 is in the applied condition due to full voltage being applied to clutch coil 102 and no voltage being applied to brake coil 106. Simultaneously, the control computer applies full voltage to brake coil 106 and systematically reduces the voltage to clutch coil 102 thus releasing drive brake 18 and engaging clutch 16 which accelerates the output shaft 20 according to the pre-programmed acceleration stage 300 shown in FIG. 5. Because a DC voltage coil is used for clutch oil 102, it is possible to adjust the slope of the acceleration curve to suit a particular requirement. The rate of acceleration stage 300 is controlled by the rate of decreasing the DC voltage to clutch coil 102 from full voltage to 0 voltage.

The high speed stage 302 occurs when the two speed drive motor is operating at full speed, clutch 16 is engaged, and drive brake 18 is released. The high speed stage 302 continues until the pre-programmed high speed deceleration position, point 314, is reached. At this point, the control computer disconnects power to the two speed drive motor and systematically reduces the DC voltage to brake coil 106 thus applying drive brake 18 which decelerates output shaft 20 according to the pre-programmed deceleration stage 304 shown in FIG. 5. Brake coil 106 is also a DC voltage coil so it is therefore possible to adjust the slope of the deceleration curve to suit a particular requirement. The rate of deceleration stage 304 is controlled by the rate of decreasing the DC voltage to brake coil 106 from full voltage to 0 voltage.

When the speed of output shaft 20 has been reduced to coincide with the low speed capabilities of the two speed drive motor, the power to the two speed drive motor is supplied through a low speed potentiometer thus operating the two speed drive motor at a reduced speed. Clutch 16 is in the disengaged position due to a lack of voltage being applied to clutch coil 102 and full voltage is again applied to the brake coil 106 thus releasing drive brake 18 and allowing output shaft 20 to rotate at the reduced speed of the two speed drive motor. This condition is represented by low speed stage 306 shown in FIG. 5.

The low speed stage 306 continues until the pre-programmed low speed deceleration position, point 316, is reached and low speed deceleration stage 308 is entered. At this point, the controlling computer disconnects the power from the two speed drive motor and removes the DC voltage from brake coil 106 thus applying drive brake 18 and bringing both input shaft 12 and output shaft 20 to a stop. In order to begin the cycle again, the power is applied m the two speed drive motor through the high speed potentiometer and full voltage is applied to clutch coil 102 thus allowing input shaft 12 to rotate with the high speed drive motor independent of output shaft 20.

While the above detailed description describes the preferred embodiment of the present invention, it is to be understood that the present invention is susceptible to modification, variation and alteration without deviating from the scope and fair meaning of the subjoined claims.

What is claimed is:

1. A drive for an apparatus comprising:
   a stationary housing;
   output means for transmitting rotation from said drive, said output means rotatably mounted in said housing;
   input means for transmitting rotation to said drive, said input means rotatably mounted in said housing;
   selectively operable brake means for prohibiting rotation of said output means with respect to said housing;
   selectively operable clutch means for locking said input means to said output means; and
   means for controlling said selectively operable brake and clutch means such that said input means drives said output means between a start position and a stop position along a specified multi-speed program, said controlling means being capable of self-adjusting to meet said specified multi-speed program.

2. The clutch/brake drive of claim 1 further comprising fan means for moving air around said stationary housing.

3. The clutch/brake drive of claim 1 wherein said output means comprises a shaft rotatably mounted in said stationary housing.

4. The clutch/brake drive of claim 1 wherein said input means comprises a shaft rotatably mounted in said stationary housing.

5. The clutch/brake drive of claim 1 wherein said brake means comprises a plurality of interleaved first friction disks alternately splined, respectively, to said output means and said stationary housing.

6. The clutch/brake drive of claim 1 wherein said clutch means comprises a plurality of interleaved second friction disks alternately splined, respectively, to said input means and said output means.

7. The clutch/brake drive of claim 1 wherein said clutch means is movable to a released condition by a DC voltage coil.

8. The clutch/brake drive of claim 1 wherein said brake means is movable to a disengaged condition by a DC voltage coil.

9. The clutch/brake drive of claim 1 wherein said controlling means comprises:
   an encoder operably associated with said output means for determining the rotative position of said output means;
   computer means in communication with said encoder for selectively controlling said apparatus, said brake means and said clutch means such that said drive means drives said machine along said specified multi-speed program.

* * * * *

UNITED STATES PATENT AND TRADEMARK OFFICE
CERTIFICATE OF CORRECTION

PATENT NO. : 5,360,091

DATED : November 1, 1994

INVENTOR(S) : Gordon M. Sommer

It is certified that error appears in the above-indentified patent and that said Letters Patent is hereby corrected as shown below:

Title page, Abstract, line 2, "shafts" should be --shaft's--

Col. 2, line 21, "homing" should be --housing--;

Col. 2, line 42, "beating" should be --bearing--;

Col. 2, line 44, "chamber 38" should be --chamber 40--;

Col. 2, line 50, ",housing" should be --housing--;

Col. 3, line 11, "miter" should be --roller--;

Col. 3, line 13, "beating" should be --bearing--;

Col. 3, line 34, "homing 66" should be --housing 66--;

Col. 3, lines 34-35, "homing 68" should be --housing 68--;

Col. 3, line 36, "homing 66" should be --housing 66--;

Col. 3, line 36, after "interior" insert --cavity 86.--;

UNITED STATES PATENT AND TRADEMARK OFFICE
CERTIFICATE OF CORRECTION

PATENT NO. : 5,360,091

DATED : November 1, 1994

INVENTOR(S) : Gordon M. Sommer

It is certified that error appears in the above-indentified patent and that said Letters Patent is hereby corrected as shown below:

Col. 3, line 50, "homing" should be --housing--;

Col. 3, line 58, "homing" should be --housing--;

Col. 4, line 8, "plurality)," should be --plurality--;

Col. 4, line 13, "homing" should be --housing--;

Col. 4, line 26, "homing" should be --housing--;

Col. 6, line 57, after "can" insert --be--;

Col. 6, line 64, "mount" should be --amount--;

Col. 6, line 68, after "meet" delete "the";

Col. 7, line 16, "oil" should be --coil--; and

Col. 7, line 57, "m" should be --to--.

Signed and Sealed this

Twenty-eight Day of March, 1995

BRUCE LEHMAN

Attest:

Attesting Officer

Commissioner of Patents and Trademarks